A. L. SMYLY.
GAS TESTER.
APPLICATION FILED SEPT. 18, 1913.
1,146,531.
Patented July 13, 1915.
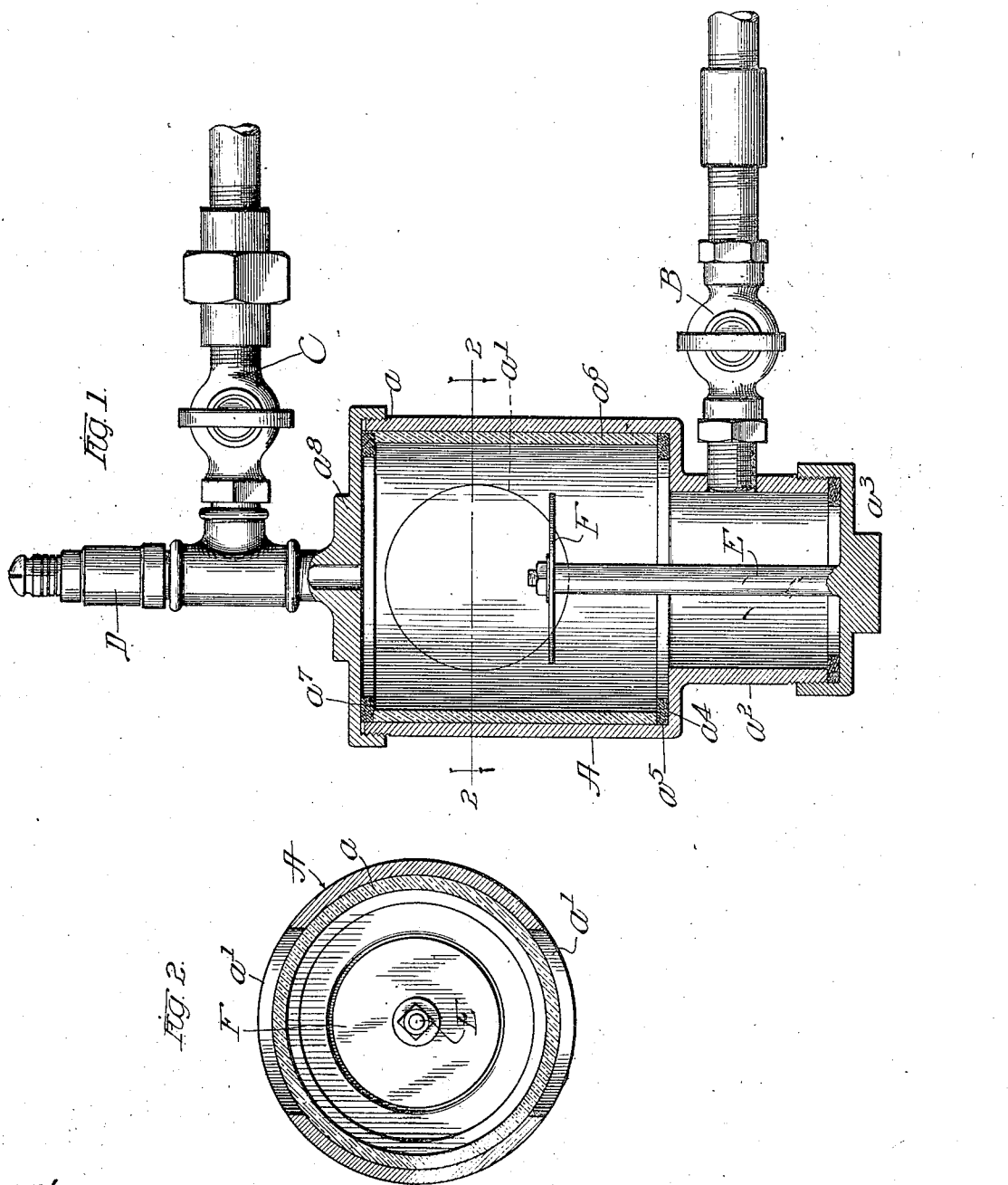

UNITED STATES PATENT OFFICE.

ARTHUR L. SMYLY, OF CHICAGO, ILLINOIS.

GAS-TESTER.

1,146,531.  Specification of Letters Patent.  Patented July 13, 1915.

Application filed September 18, 1913. Serial No. 790,495.

*To all whom it may concern:*

Be it known that I, ARTHUR L. SMYLY, a citizen of the United States of America, and resident of Chicago, Cook county, Illinois, have invented a certain new and useful Improvement in Gas-Testers, of which the following is a specification.

My invention relates to gas testers of that kind in which a chamber is provided for inclosing a piece of prepared paper, and through which the gas is allowed to flow. The said paper is visible through the wall of the chamber, the latter being of glass. After the paper has become discolored, it is then removed and inspected.

The object of my invention is to provide a gas tester in which the construction is such that the paper can be removed without disturbing either the inlet or the outlet gas connection.

It is also an object to provide a novel construction and arrangement whereby the glass or other transparent member is less liable to be broken, and is less expensive than heretofore, being in the form, for example, of a simple ring or cylinder, straight and open at both ends thereof.

To these and other useful ends, my invention consists in matters hereinafter set forth and claimed.

In the accompanying drawings:—Figure 1 is a vertical section of a gas tester embodying the principles of my invention. Fig. 2 is a cross section in line 2—2 in Fig. 1.

As thus illustrated, my invention comprises a cylindrical upright body A having an open and externally screw threaded upper end $a$, side openings $a^1$, a reduced lower end portion $a^2$, and a closure $a^3$ for said portion $a^2$, screwed thereon. The casing thus formed provides a seat or shoulder $a^4$, upon which rests the rubber gasket $a^5$, the cylinder of glass $a^6$ being disposed upright with its lower end resting on said gasket. The glass ring or cylinder, which is straight and open at top and bottom, reaches nearly to the upper edge of the casing. A gasket $a^7$ rests on the upper end of said glass member $a^6$; a top or cover $a^8$ is screwed upon the upper end of the casing, bearing against the gasket $a^7$, and thus compressing both gaskets to make the inclosure gas tight. Also, these gaskets prevent breakage of the glass member. The gas inlet connection B enters the side of the portion $a^2$, and the gas outlet connection C leads away from the top $a^8$, whereby the gas enters the side of the lower part of the tester and leaves at the upper end thereof. The outlet connection C may terminate in a burner D, for affording light and for permitting the escape of the gas, if such is desired. The inlet B may have a valve $b$ to control the flow of gas. Also, as shown, the outlet connection C may have a lateral extension $c$ leading to any desired point, and provided with a valve $c^1$ of any suitable character. The extension $c$ can be used for allowing the gas to escape from the tester, and serve also as an upper supporting arm. The gas connection C is, therefore, preferably in the form of a T-coupling, but may be of any suitable form or character, the purpose being to provide some sort of outlet connection for the top of the body and for the escape of the gas from the latter. However, the gas tip D will serve as outlet for the gas and will maintain a sufficient flow for the operation of the device when the valve $c^1$ is closed.

An upright post E is fixed on the closure $a^3$, and extends upward into the glass member $a^6$, centrally thereof. The testing device, or indicating device, of any suitable character, is held on the top of this post. As shown, the said device consists of a disk of prepared paper F, of well known form, removably affixed to the post, disposed in a horizontal plane. When the paper F becomes discolored by contact with the gas, which condition can be ascertained by looking through the openings $a^1$, the closure $a^3$ is unscrewed and the paper removed. It will be seen that this is done without disturbing the connections B and C, and without disturbing the glass member $a^6$, the connections and structure remaining intact except for the removal of the said closure, post and disk of paper. Moreover, it will be seen that the casing A protects the glass, and makes it possible to use a glass member in an inexpensive form, which can be readily renewed when broken. But the casing, as stated, makes the tester practically safe against breakage.

What I claim as my invention is:—

1. A gas tester comprising a body forming an inclosure, gas inlet and outlet connections therefor, leading externally thereto and therefrom, at the lower and upper ends thereof, a device for indicating the character of the gas, disposed inside of said body, and means for removing said device without disturbing said body or either gas connection.

2. A gas tester comprising a body forming an inclosure, gas inlet and outlet connections therefor, a device for indicating the character of the gas, disposed inside of said body, and means for removing said device without disturbing either gas connection, said means including a post for said device, and a removable support for said post, forming a closure for said body.

3. A gas tester comprising a body forming an inclosure, gas inlet and outlet connections therefor, leading externally thereto and therefrom, at the lower and upper ends thereof, a device for indicating the character of the gas, disposed inside of said body and means for removing said device without disturbing said body or either gas connection, said body having a transparent wall for viewing said device.

4. A gas tester comprising a body forming an inclosure, gas inlet and outlet connections therefor, a device for indicating the character of the gas, disposed inside of said body, and means for removing said device without disturbing either gas connection, the inlet connection being at one side of the lower end of said body, the outlet connection being at the upper end thereof, and said means including a closure for the lower end of said body, and a post on said closure, having said device secured to the upper end thereof.

5. A gas tester comprising a hollow transparent member open at opposite ends thereof, a casing inclosing said member, provided with means bearing against the ends of said member to make the same gas tight, and having an opening for exposing a portion of the side of said member, inlet and outlet connections for the lower and upper ends of said casing, for passing the gas through said member, and a device within the said member, visible through said opening, for indicating the character of the gas.

6. A gas tester comprising a hollow transparent member open at opposite ends thereof, a casing inclosing said member, provided with means bearing against the ends of said member to make the same gas tight, and having an opening for exposing a portion of the side of said member, inlet and outlet connections for the lower and upper ends of said casing, for passing the gas through said member, and a device within the said member, visible through said opening, for indicating the character of the gas, said casing having means for removing said device without disturbing said member or either connection.

7. A gas tester comprising a hollow transparent member open at opposite ends thereof, a casing inclosing said member, provided with means bearing against the ends of said member to make the same gas tight, and having an opening for exposing a portion of the side of said member, inlet and outlet connections for the lower ends of said casing, for passing the gas through said member, and a device within the said member, visible through said opening, for indicating the character of the gas, said casing having a closure at the lower end thereof, removable without disturbing said member or either connection, and a post on said closure, provided with means for holding said device.

Signed by me at Chicago, Illinois, this 6th day of September, 1913.

ARTHUR L. SMYLY.

Witnesses:
RACHEL J. RICHARDSON,
ROSE E. SEHUEM.

Copies of this patent may be obtained for five cents each, by addressing the "Commissioner of Patents, Washington, D. C."

It is hereby certified that in Letters Patent No. 1,146,531, granted July 13, 1915, upon the application of Arthur L. Smyly, of Chicago, Illinois, for an improvement in "Gas-Testers," an error appears in the drawings requiring correction as follows: For Fig. 1 as shown in the patent see Fig. 1 as here shown:

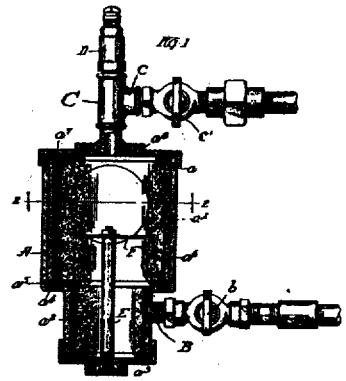

and that the said Letters Patent should be read with this correction therein that the same may conform to the record of the case in the Patent Office.

Signed and sealed this 24th day of August, A. D., 1915.

[SEAL.]

J. T. NEWTON,
*Acting Commissioner of Patents.*